(12) United States Patent
Taguchi

(10) Patent No.: US 7,146,484 B2
(45) Date of Patent: Dec. 5, 2006

(54) METHOD AND APPARATUS FOR CACHING STORAGE SYSTEM

(75) Inventor: Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 10/866,752

(22) Filed: Jun. 15, 2004

(65) Prior Publication Data

US 2005/0278501 A1 Dec. 15, 2005

(51) Int. Cl.
*G06F 12/10* (2006.01)
*G06F 15/16* (2006.01)

(52) U.S. Cl. ................ 711/203; 711/119; 711/141; 709/216; 709/245

(58) Field of Classification Search ........... 711/119, 711/141, 203; 709/216, 245
See application file for complete search history.

(56) References Cited

U.S. PATENT DOCUMENTS

| | | | |
|---|---|---|---|
| 5,426,747 | A | 6/1995 | Weinreb et al. |
| 5,526,509 | A | 6/1996 | Doi et al. |
| 5,590,300 | A | 12/1996 | Lautzenheiser |
| 5,790,828 | A | 8/1998 | Jost |
| 5,892,970 | A * | 4/1999 | Hagersten ............... 710/5 |
| 5,996,046 | A | 11/1999 | Yagisawa et al. |
| 6,105,103 | A | 8/2000 | Courtright, II et al. |
| 6,343,345 | B1 | 1/2002 | Hilla et al. |
| 6,374,334 | B1 | 4/2002 | Suga et al. |
| 6,711,632 | B1 | 3/2004 | Chow et al. |
| 6,732,250 | B1 * | 5/2004 | Durrant ............... 711/202 |

FOREIGN PATENT DOCUMENTS

EP    0 349 757 B1    1/1990

OTHER PUBLICATIONS

Clark, "IP SANs A Guide to iSCSI, iFCP, and FCIP Protocols for Storage Area Networks", Addison-Wesley, Pearson Education, 1999, pp. 13-18, 115-126 and 139-149.
"Building Storage Networks", Network Professional's Library, Osborne/McGraw-Hill, pp. 28-30 and 67-69.
VERITAS Volume Manager 4.0, User's Guide—VERITAS Enterprise Administrator, p. 94.
Cisco Network Volume Manager, Cisco Systems, 1992-2003.
Schulman, Hitachi Data Systems, "Disaster Recovery Issues and Solutions", A White Paper, Dec. 2003, pp. 8-15.

* cited by examiner

*Primary Examiner*—Jack A. Lane
(74) *Attorney, Agent, or Firm*—Mattingly, Stanger, Malur & Brundidge, P.C.

(57) ABSTRACT

A caching storage method and system that includes one or more host devices, network devices, storage devices, and logical volume management functions. An input/output (I/O) request is received from the host device that includes a logical block address. The logical block address is translated into an original storage address for a storage device that includes an original storage ID, storage unit ID and block address. It is determined if a cache is defined for the storage device. The original storage address is translated into an address for a cache associated with the storage device if the cache is defined for the storage device. A read request or a write request is sent to the cache address based on the I/O request. Block data is received or transferred from/to the cache defined for the storage device identified by the original storage ID and storage unit ID.

21 Claims, 13 Drawing Sheets

| Logical Volume ID (501) | Logical Block Address (Start)/(End) (502) | Original Storage ID (WWN) (503) | Original Storage Unit ID (LUN) (504) | Original Storage LBA (Start)/(End) (505) | Cache Storage ID (WWN) (506) | Cache Storage Unit ID (LUN) (507) | Cache Storage LBA (Start)/(End) (508) |
|---|---|---|---|---|---|---|---|
| 00 | 0x00000000/ 0x1fffffff | 0x50060e8000004906 | 04 | 0x00000000/ 0x10000000 | null | null | null |
| | | 0x50060e8000000e0a | 0B | 0x00000000/ 0x01000000 | null | null | null |
| | | 0x50060e8000000e0a | 0C | 0x00000000/ 0x0effffff | 0x50060e80000000ab | 01 | 0xa0000000/ 0xaeffffff |
| 01 | 0x20000000/ 0x2fffffff | 0x50060e80000000ab | 00 | 0x10000000/ 0x11ffffff | null | null | null |
| | | 0x50060e8000000e0a | 01 | 0x00000000/ 0x0effffff | 0x50060e80000000ab | 02 | 0x00000000/ 0x0effffff |
| ... | ... | ... | ... | ... | ... | ... | ... |

FIG 8

METHOD AND APPARATUS FOR CACHING STORAGE SYSTEM

BACKGROUND

1. Field of the Invention

This invention relates to storage systems, and more specifically to improving performance in Storage Area Networks with low performance and high performance storage.

2. Description of the Related Art

Storage of data has always been important in business and computing systems. As more and more businesses are transacting business and activities via electronic medium and serving more of a global community, the need for more efficient data storage is increasing. Storage Area Networks (SANs) provide a solution for storing and retrieving mass amounts of data. FIG. 1 shows a system diagram of a typical SAN architecture. A SAN may consist of one or more host devices, 10–16, interconnected to one or more network devices, 18–20, through a first interface or network 28. Network devices 18–20 may be interconnected to one or more data storage devices 22–26 via a second network or interface 30. The first network/interface 28 and the second network/interface 30 may be the same network/interface. Commonly, in SAN architectures, interfaces 28 and 30 may use a Fibre Channel protocol. However, any networking or SCSI technology may be used to create a SAN. For example, an Ethernet network and/or an Internet protocol-based network may be used to provide interconnections between host computers, network devices or switches, and data storage devices. A host device 10–16, may access a data storage device 22–26 that is local or resides a short distance from the host device 10–16, or may access a data storage device 22–26 that is remote or physically resides over a long distance from the location of the host device 10–16.

The existence of Internet Small Computer System Interface protocol (iSCSI) or Fibre Channel over Internet Protocol (FCIP) has enabled Internet Protocol (IP) network based SAN implementations. However, IP network connections are problematic in that they generally give lower throughput than traditional Fibre Channel network links. This is especially more notable in IP connections over long distances to remote storage devices. Therefore, there is a need to provide increased performance when low performance storage or network connections are used.

SUMMARY OF THE INVENTION

A caching storage method and system that includes one or more host devices, network devices, storage devices, and logical volume management functions. An input/output (I/O) request is received from the host device that includes a logical block address. The logical block address is translated into an original storage address for a storage device that includes an original storage ID, storage unit ID and block address. It is determined if a cache is defined for the storage device. The original storage address is translated into an address for a cache associated with the storage device if the cache is defined for the storage device. A read request or a write request is sent to the cache address based on the I/O request. Block data is received or transferred from/to the cache defined for the storage device identified by the original storage ID and storage unit ID. The original storage unit is always synchronized with the cache storage units by remote storage replication function. Before read operations and write operations, data in the storage unit is replicated to the cache defined for the storage unit. Also data written to the cache during write operations is copied to the storage unit.

BRIEF DESCRIPTION OF THE DRAWINGS

The present invention is further described in the detailed description which follows in reference to the noted plurality of drawings by way of nonlimiting examples of embodiments of the present invention in which like reference numerals represent similar parts throughout the several views of the drawings and wherein:

FIG. 8 is a diagram of a data structure for a logical volume structure information, according to an example embodiment of the present invention;

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the present invention relate to logical volume management that manages cache storage definitions that may be added to a storage array. The logical volume management forwards host I/O (input/output) messages to an original storage unit or storage array. If a cache unit is defined for the storage array, the logical volume management forwards the request to the cache storage array. The cache storage array loads or saves the data as requested. The cache storage returns a reply message to the host device immediately, may then copy the updated data to the storage array using data replication function.

Figure 1:
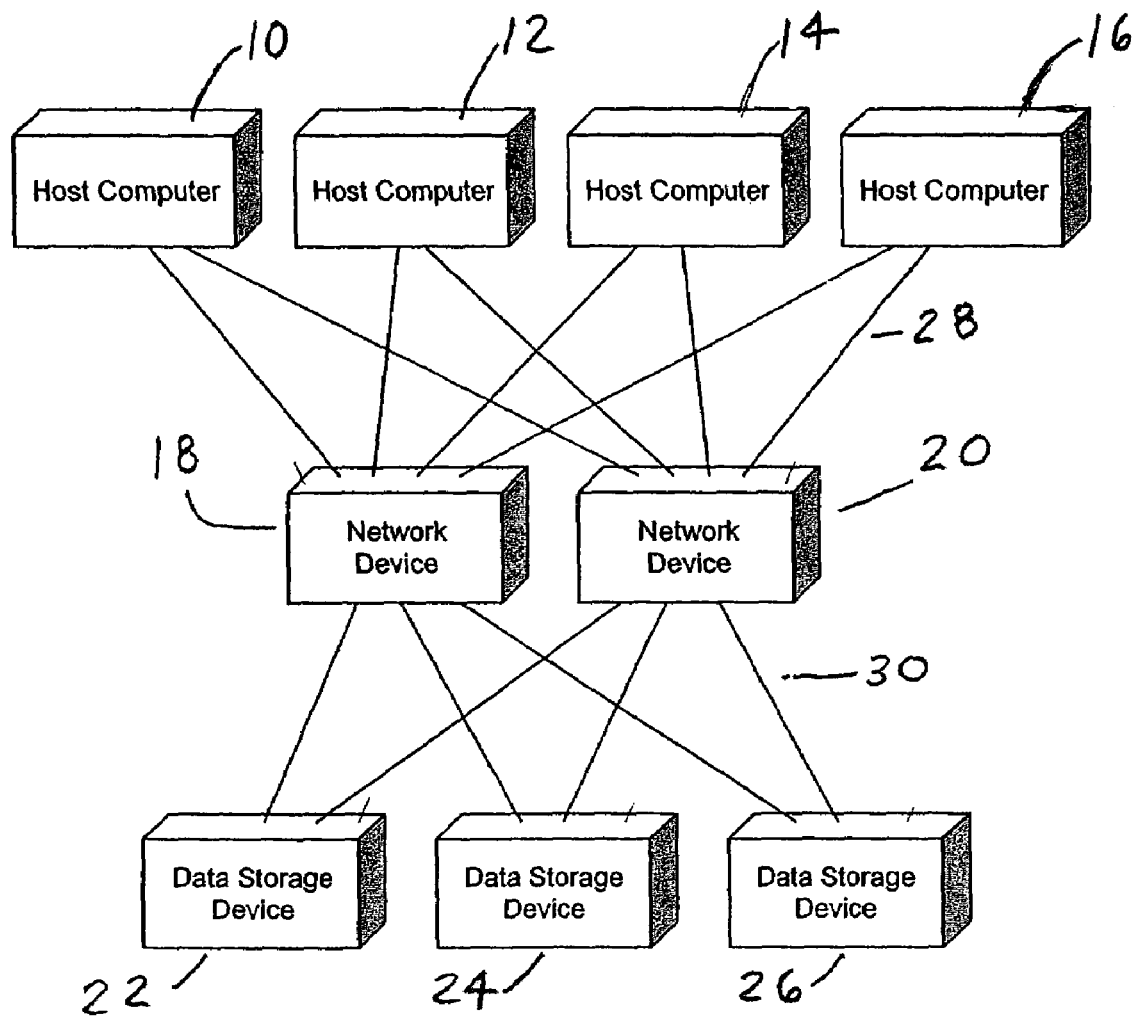
FIG. 1 is a system diagram of a typical SAN network architecture.
Figure 2:
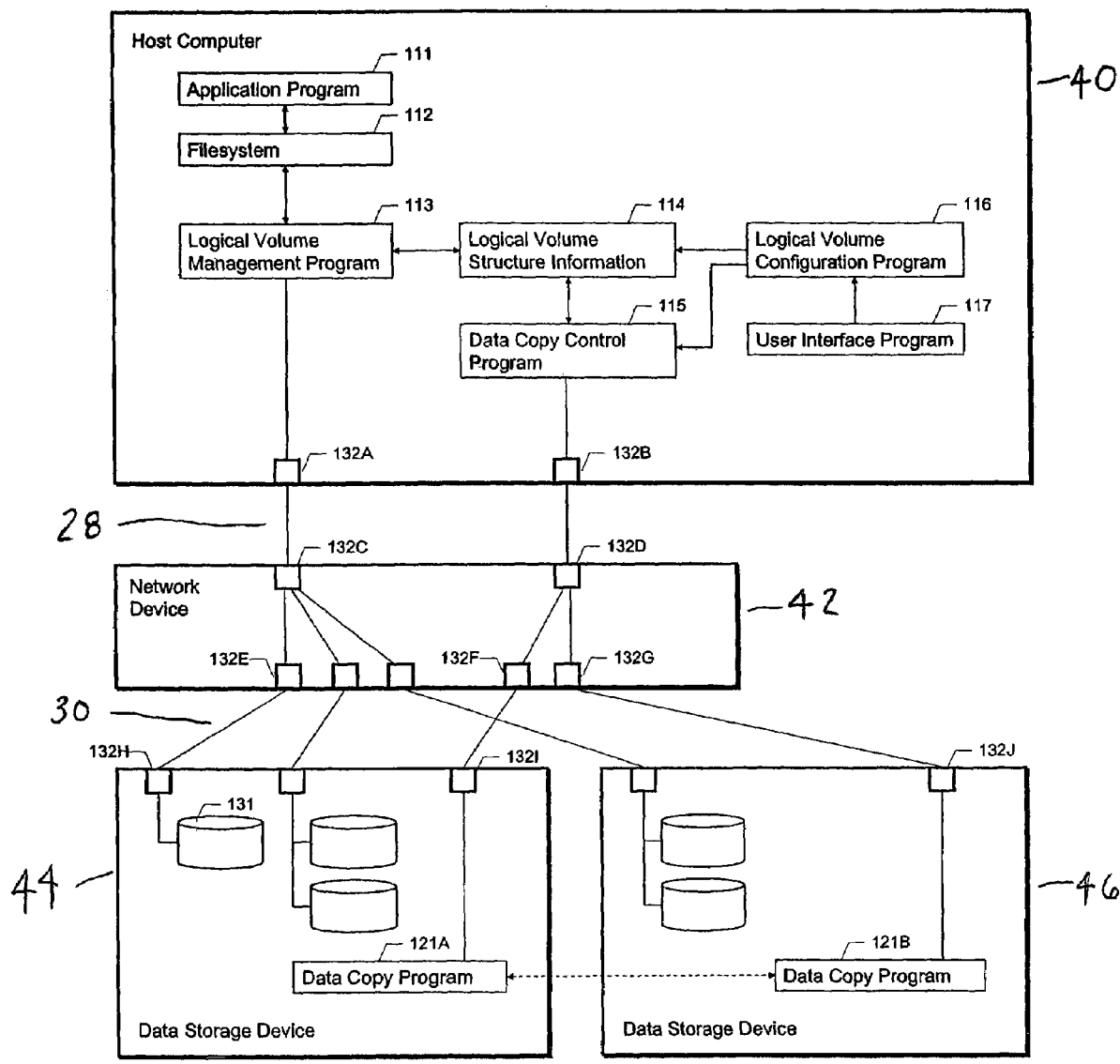
FIG. 2 is a diagram of a system with logical volume management in a host computer, according to an example embodiment of the present invention.

FIG. 2 shows a diagram of a system with logical volume management in a host computer, according to an example embodiment of the present invention. A host computer 40, network device 42, and data storage devices 44 and 46 are interconnected by network connections 28, 30. Network connections 28, 30 may be any type network connection or use any type protocol that can interconnect host computer 40, a network device 42, and data storage devices 44 and 46, for example, Fibre Channel, SCSI, Ethernet, InfiniBand, etc. Although only one host computer 40, one network device 42, and two data storage devices 44 and 46 are shown in this embodiment, multiple host devices, network devices and data storage devices may be implemented and still be within the spirit and scope of the present invention.

A host computer 40 may include one or more application programs 111, file system 112, and logical volume management that may include a logical volume management program 113 interconnected to a logical volume structure information 114, that is interconnected to a logical volume configuration program 116 and a data copy control program 115. The logical volume configuration program 116 may provide a user interface program 117 that allows a user to input or review logical volume management information. The logical volume management program 113 may be interconnected to the file system 112 and a network port 132A providing access to the network device 42. Further, the data copy control program 115 may be interconnected to a network port 132B of the host computer 40 providing connection to the network device 42. The logical volume management, 113–117, performs logical volume creation and configuration, logical volume I/O control, and cache storage configuration and data synchronization between original data storage and cache storage.

The application program 111 may be a software program that reads or writes data files from/to one or more data storage devices, 44, 46. For example, the application program 111 may be a traditional database application such as Oracle or a Microsoft (MS) exchange server. The application program 111 may work on data files provided by a file system 112. The file system 112 provides file I/O to application programs 111, and also provides block data I/O to storage devices, 44, 46.

The network device 42 may provide a switching function and include ports 132C and 132D that interface to the host computer 40 network ports 132A and 132B, respectively. Further, the network device 42 may include one or more network ports 132E that may interface to one or more network ports 132H of a data storage device 44, therefore, providing an interface between the logical volume management, 113–117, of the host computer 40 and the data storage device 44. Moreover, the network device 42 may include one or more network ports that provide an interface between the host computer 40 and another or a remote data storage device 46. In addition, the network device 42 may include one or more network ports 132F, 132G that provide an interface between the data copy control program 115 of a host device 40 and one or more local or remote data storage devices 44, 46 through one or more network ports of these data storage devices, 132I, 132J. This provides an interface between a data copy control program 115 and a data copy program 121A, 121B that may reside on each data storage device 44, 46. Each data storage device 44, 46 may include one or more storage units 131 and a data copy program 121A, 121B. Storage units 131 may be a cache storage, disk storage, or other type storage unit.

A data copy program 121A, 121B, may be installed on a data storage device 44, 46 and allows copying of the data saved on a primary storage unit into a secondary storage unit. For example, a data storage unit installed on a data storage device 44 may be a primary storage unit or local storage unit and another data storage unit installed on a data storage device 46 may be a secondary storage unit or remote storage unit. Therefore, a data copy control program 115 in a host computer 40 may control the copying of data using data copy programs 112A and 112B, between the primary data storage device 44 and the secondary data storage device 46. The data created by application program 111 may be stored on the primary data storage device 44. A host computer 40 may be connected to a storage unit 131 at a data storage device 44 through one or more network ports 132A, 132C, 132E and 132H on the host computer 40, the network device 42 and the data storage device 44. The data copy control program 115 may access a data copy program 121A, 121B through one or more network ports 132B, 132D, 132F, 132G, 132I and 132J on the host computer 40, the network device 42 and the data storage device 44. Data copy programs 121A and 121B may communicate with each other through one or more network ports 132I, 132F, 132G and 132J.

A host computer 40, a network device 42 and a data storage device 44, 46 may each be implemented as a traditional computer hardware architecture. For example, each device may be implemented where it includes a CPU, memory, local disk drive, network interface, input device, output device all interconnected via a bus. The network interface allows communication with external devices and the input device (e.g. keyboard, mouse, etc.) allows a user to enter input. An output device, such as a display, may also be implemented.

Figure 3:
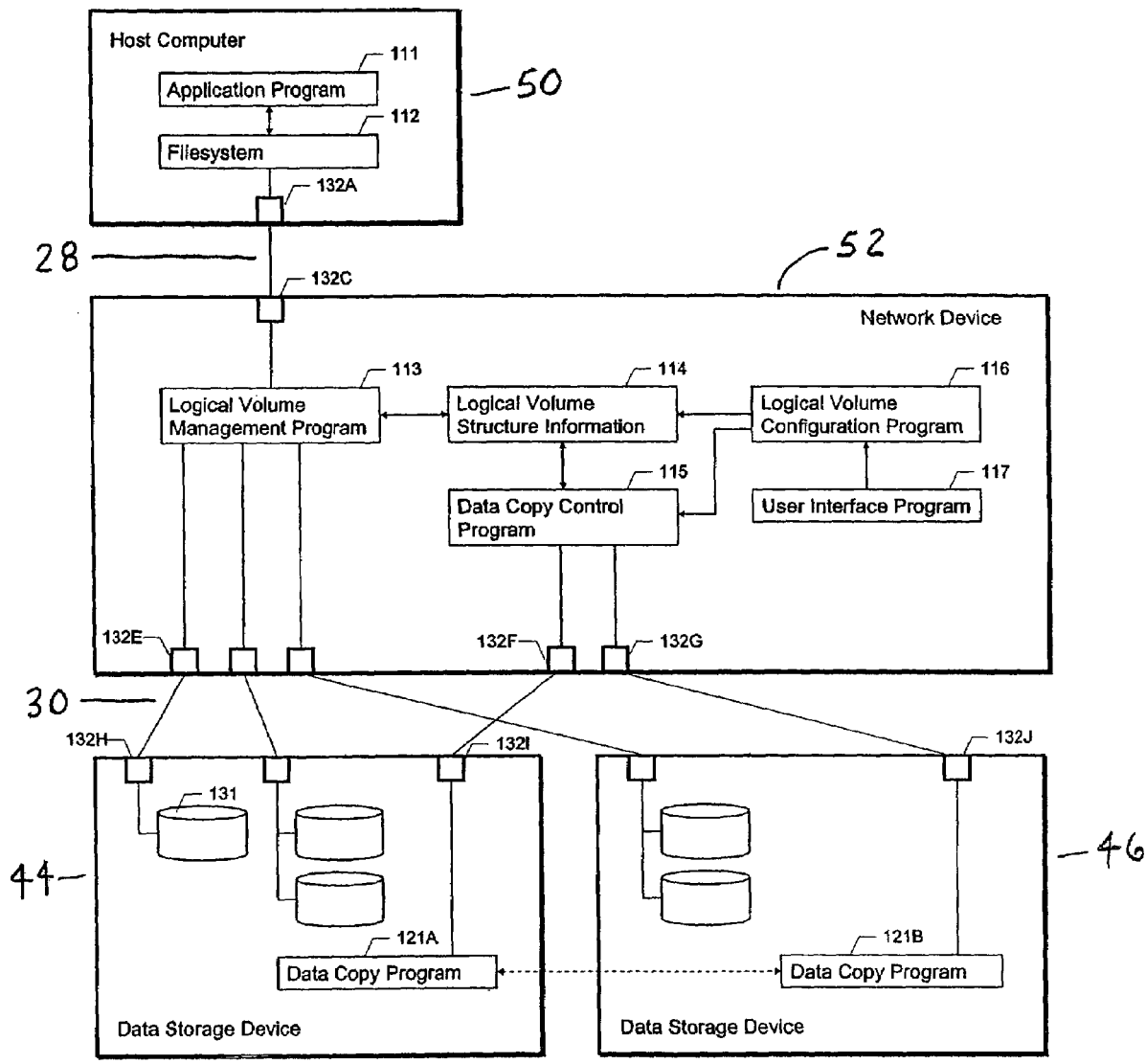
FIG. 3 is a diagram of a system with logical volume management at a network device, according to an example embodiment of the present invention.

FIG. 3 shows a diagram of a system with logical volume management at a network device, according to an example embodiment of the present invention. A host computer 50 may be interconnected with a network device 52 via an interface 28. A network device 52 may be interconnected with one or more data storage devices 44, 46 through an interface 30. This embodiment of the present invention is similar to that shown in FIG. 2 except that the logical volume management 113–117 now resides at a network device 52. In some storage system applications, it may be desirable or advantageous to locate the logical volume management 113–117 at a network device 52. In this embodiment, the logical volume management 113–117 interfaces with a host computer 50 through one or more network ports 132C of a network device 52 and one or more network ports 132A of a host computer 50. Further, a logical volume management program 113 and a data copy control program 115 of the logical volume management 113–117 may be directly connected to one or more network ports 132E and 132F, 132G, respectively, that interface to one or more data storage devices 44, 46.

Figure 4:
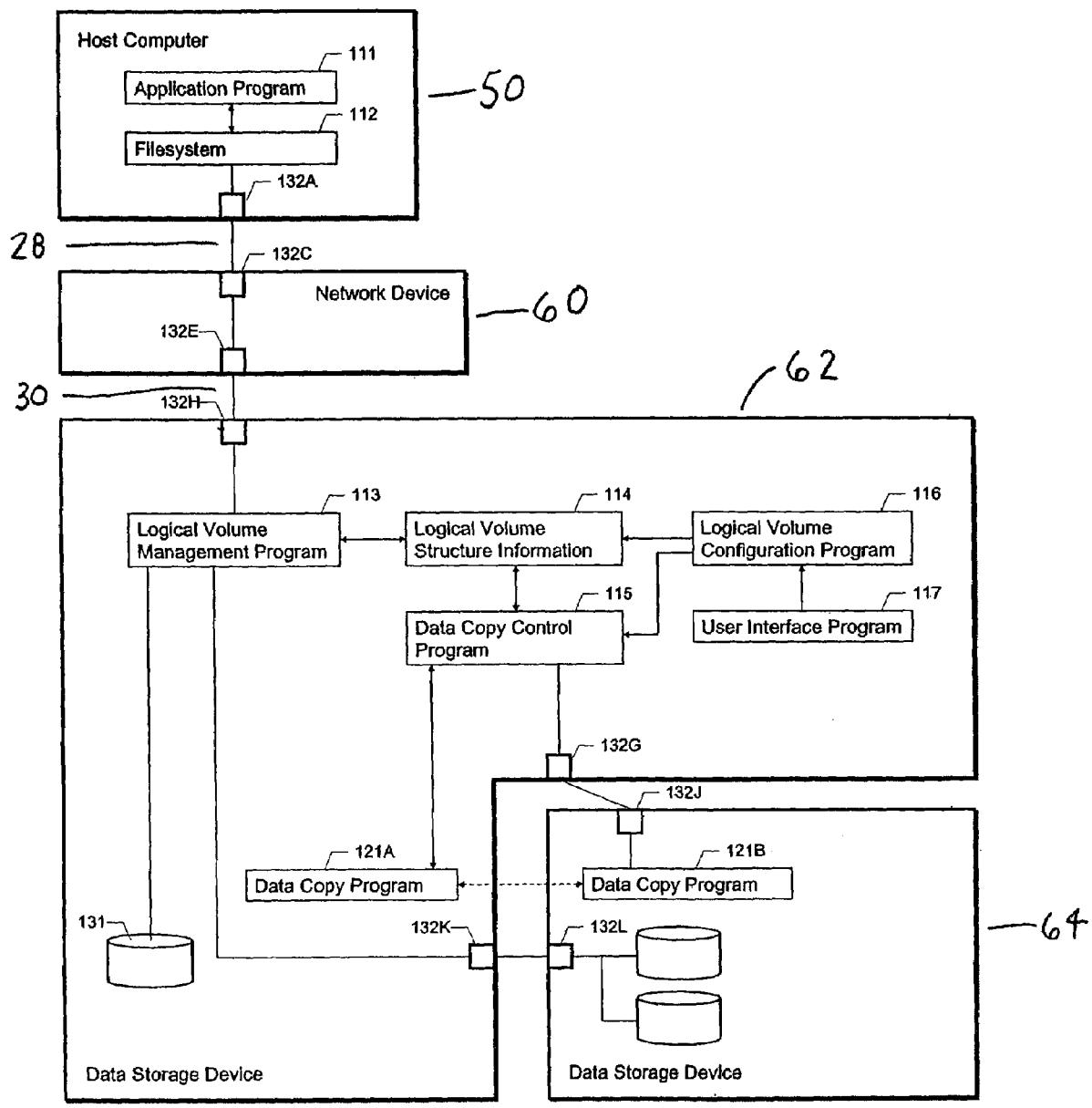
FIG. 4 is diagram of a system with logical volume management at a data storage device, according to an example embodiment of the present invention.

FIG. 4 shows diagram of a system with logical volume management at a data storage device, according to an example embodiment of the present invention. This system includes a host computer 50 connected to a network device 60 that may be interconnected to one or more data storage devices 62, 64. The host computer 50 may interface through a network port 132A to a network device 60 via an interface 28 and a network port 132C. Further, the network device 60 may use a network port 132E to interface with the logical volume management 113–117 on a data storage device 62 via a network port 132H. Logical volume management 113–117 may reside on one or more data storage device 62, 64. In this example embodiment, the logical volume management 113–117 resides on a first data storage device 62 but may not reside on a second data storage device 64. Logical volume management 113–117 may be directly connected to one or more storage units 131 that reside at a first data storage device 62, and may access one or more storage units that reside on other data storage devices 64 through a network port 132K of a first data storage device 62 and a network port 132L of a second data storage device 64. A data copy control program 115 may be directly connected to one or more data copy programs 121A that reside on a data storage device 62, and may access one or more data copy programs 121B that reside at other data storage devices 64 through one or more network ports 132G of the data storage device 62 and one or more network ports 132J of other data storage devices 64. A connection from a data storage device 62 (e.g., primary/local storage device) to another data storage device 64 (e.g., secondary/remote storage device) may be a direct connection via one or more network ports 132K, 132L or through an indirect connection (not shown) through network device 60. In this regard, a network device 60 may include one or more other network ports that interface directly with one or more network ports that reside at one or more data storage devices 64.

Figure 5:
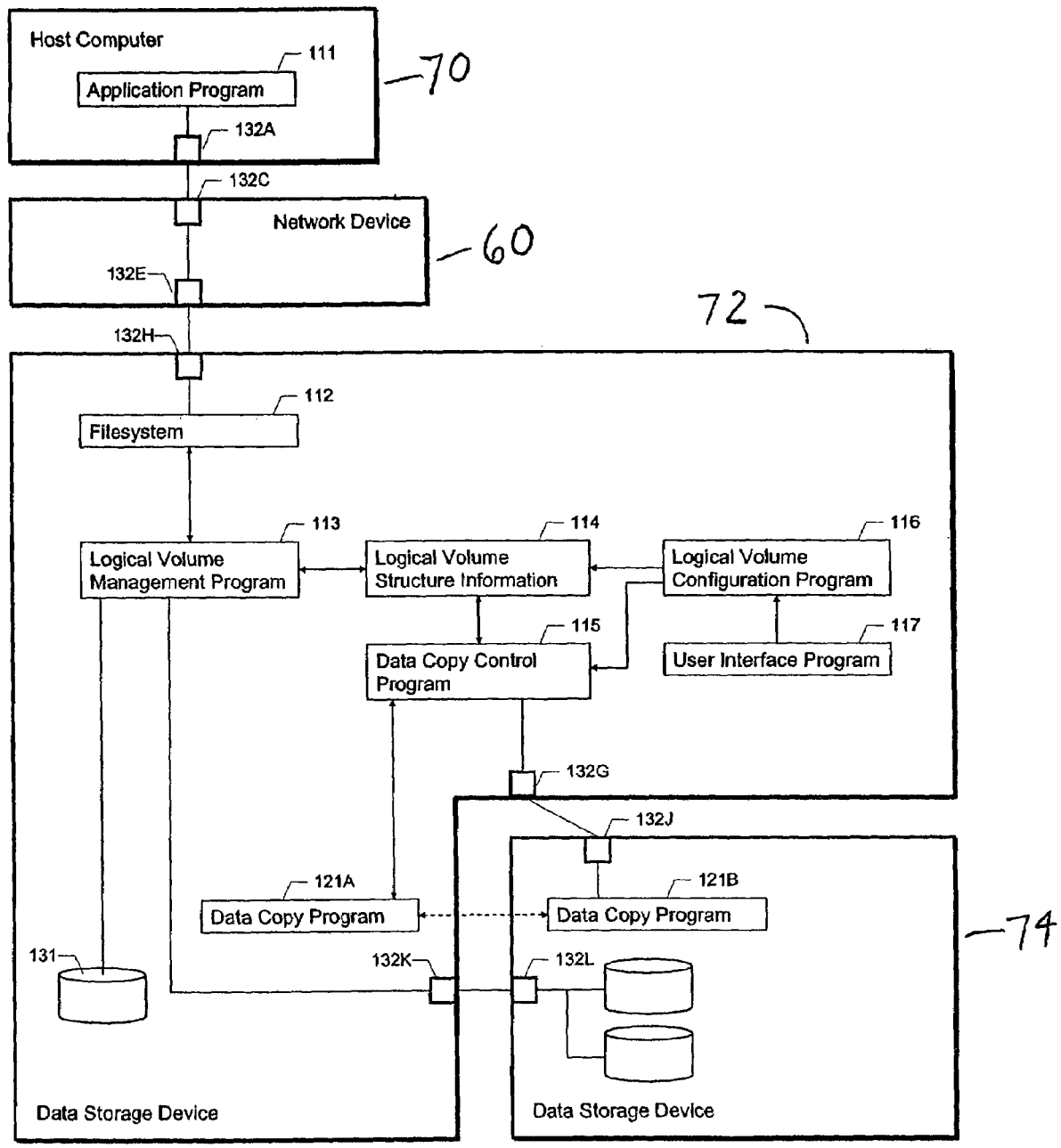
FIG. 5 is a diagram of a system with logical volume management at a Network Attached Storage, according to an example embodiment of the present invention.

FIG. 5 shows a diagram of a system with logical volume management at a Network Attached Storage, according to an example embodiment of the present invention. This system is similar to that shown in FIG. 4 except that in a Network Attached Storage (NAS), a file system 112 may be located at a data storage device 72, as opposed to at a host computer 70. An application program 111 may issue file I/O to the file system 112 at a data storage device 72 through a network device 60 and one or more network ports 132A, 132C, 132E and 132H.

Figure 6:
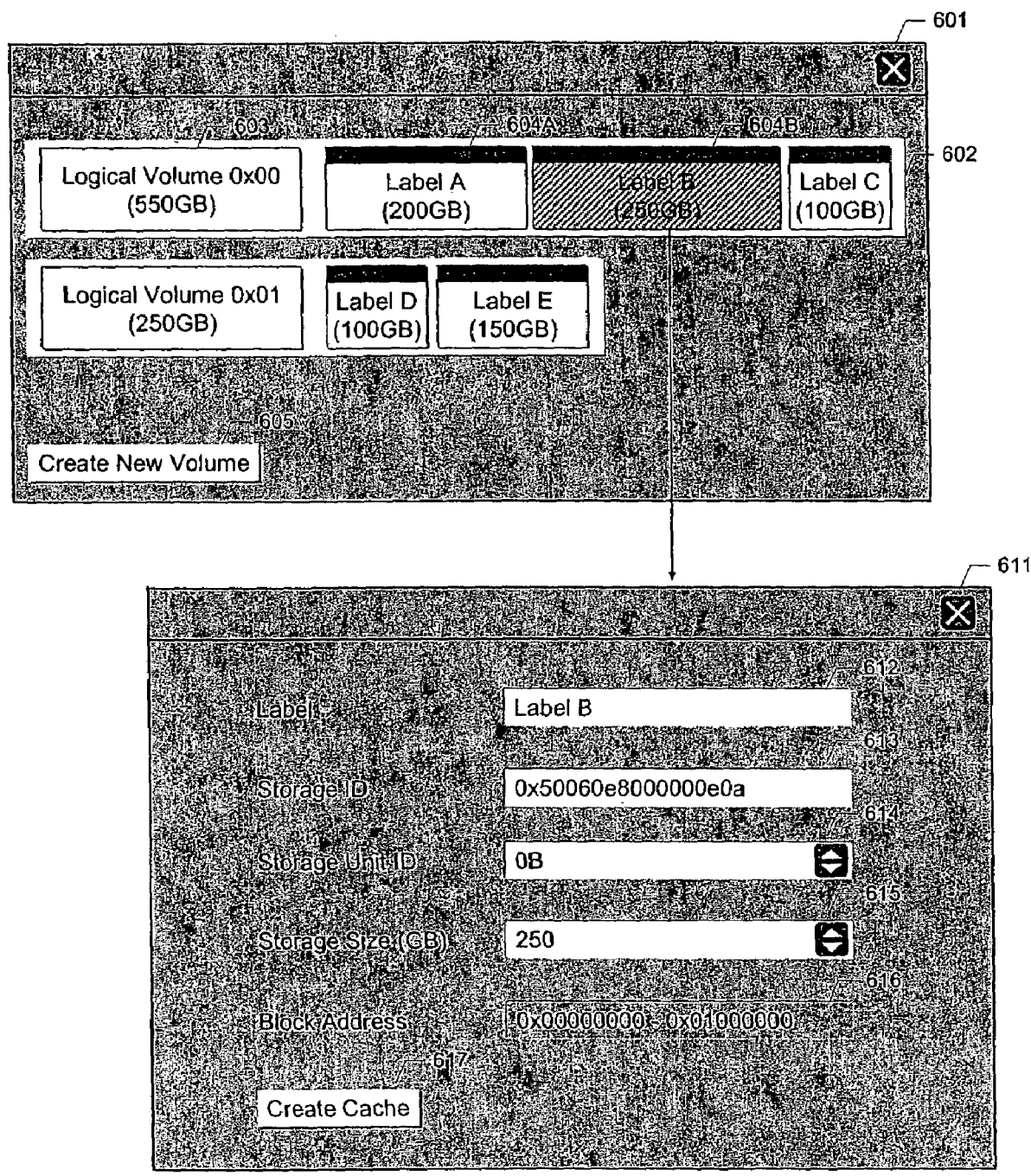
FIG. 6 is a diagram of a logical volume configuration GUI, according to an example embodiment of the present invention.

FIG. 6 is a diagram of a logical volume configuration GUI, according to an example embodiment of the present invention. Screen 601 shows an example graphical user interface (GUI) main screen of a user interface program 117 that may be used to allow a user to operate and monitor a logical volume configuration. Row 602 shows a structure of a logical volume 0x00, 603 and labels of three storage units, 604A, 604B, 604C, associated with logical volume 0x00, 603. As shown in FIG. 6, logical volume 0x00, 603 includes three labels, label A, 604A, representing a storage unit of 200 GB, label B, 604B, representing a storage unit of 250 GB, and label C, 604C, representing a storage unit of 100 GB. These labels may be a name or phrase and represent storage units such as storage units 131 shown in the previous figures. Further, a second logical volume 0x01 is shown, that includes two storage units, one represented by label D of 100 GB and another storage unit represented by label E of 150 GB. Further, this screen 601 allows a user the option of creating a new logical volume with a selection button or icon 605. If one or more new logical volumes are created, they will then be added to the list with their associated storage units as defined by the user. Selection of any of the labels may provide the user with another screen 611 displaying details about a storage unit represented by the selected label.

The second screen 611 provides configuration details that may be displayed upon selection by a user of the storage unit label B, 604B. The screen 611 allows a user or an administrator to assign a simple name (e.g., "label B") as a volume label assigned to a storage unit. Further, the user may set a storage ID 613, a storage unit ID 614, and assign a capacity size 615. These options may be set by a user by manually typing in the information or may be set by the user using a scrolling key that presents predefined options for selection. A block address range 616 is an address range that may be determined automatically by its capacity size. In another embodiment of the present invention, a block address range 616 may be manually entered by a user. After the user has completed entering or editing the information in screen 611, this information may be saved in a logical volume structure information 114. A "create cache" option 617 may allow the user to launch a cache storage configuration screen (not shown) for creation or editing of information for a cache storage device. The cache configuration screen may have functions to input a cache storage ID and cache storage unit. It may not need to have a capacity size input space since cache storage size may usually be the same as the original storage unit.

Figure 7:
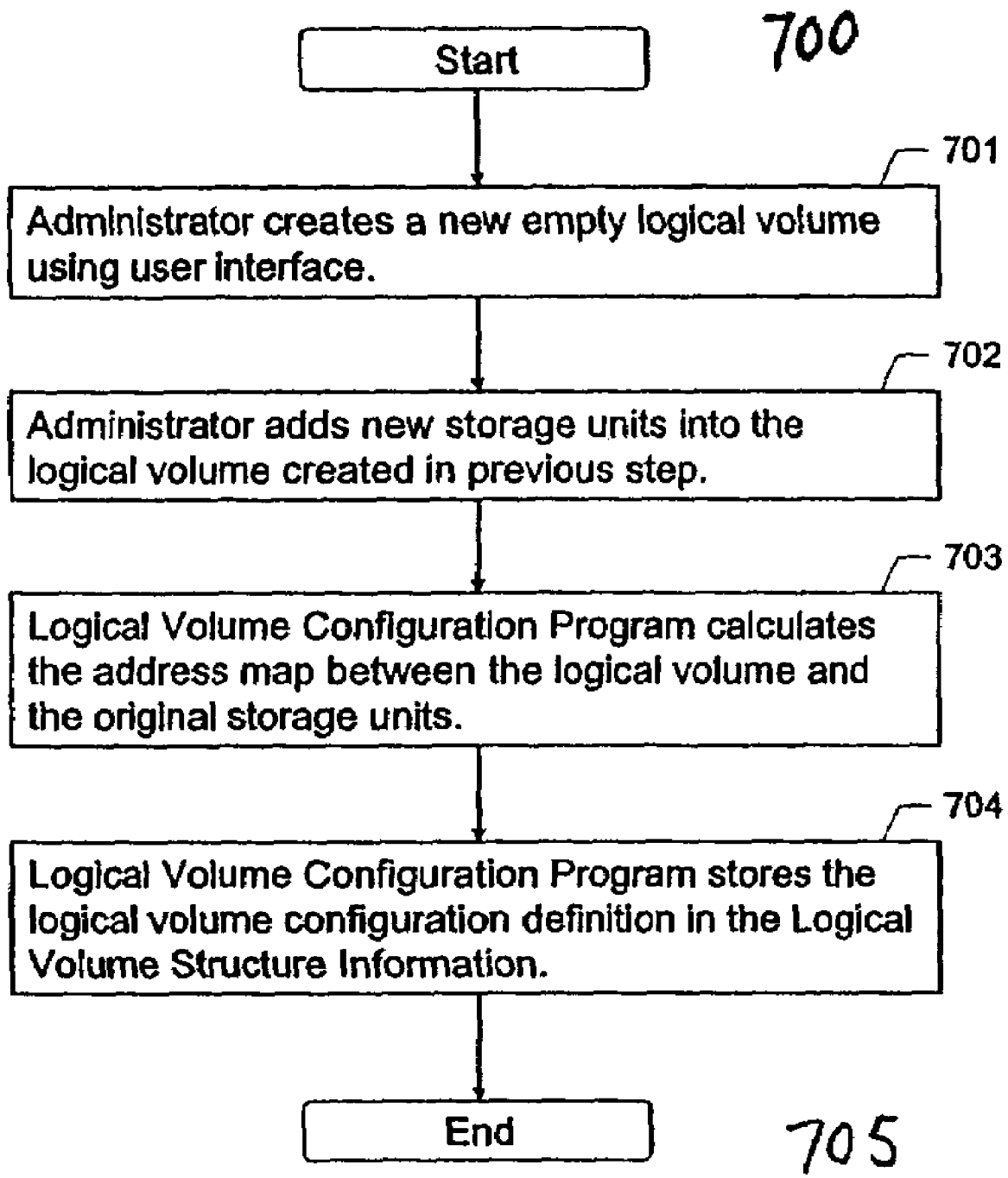
FIG. 7 is a flowchart of a process for creating a logical volume, according to an example embodiment of the present invention.

FIG. 7 shows a flowchart of a process for creating a logical volume, according to an example embodiment of the present invention. A user or administrator may start the process, step 700, using a user interface program 117. The administrator creates a new empty logical volume using a user interface 601, step 701. The administrator then may add new original storage units into the logical volume created, step 702. A logical volume configuration program 116 may then calculate an address map between the logical volume and the original storage units, step 703. A logical volume configuration program 116 may then store the logical volume configuration definition in a logical volume structure information 114, step 704. The process then ends, step 705.

FIG. 8 shows a diagram of a data structure for a logical volume structure information 114, according to an example embodiment of the present invention. Although the information shown in FIG. 8 is shown in a table format, this information may be stored or exist in any type of format and not necessarily be in a table format. A logical volume structure information 114 according to embodiments of the present invention may include a variety of information including, for example, a logical volume ID 501, a logical block address (LBA) (Start/End) 502, an original storage ID (World Wide Name—WWN) 503, an original storage unit ID (LUN) 504, an original storage LBA (Start/End) 505, a cache storage ID (WWN) 506, a cache storage unit ID (LUN) 507, and a cache storage LBA (Start/End) 508. The logical volume structure information 114 shows a logical to physical address mapping between a logical volume, original storage, and cache storage. The logical volume may be a virtual storage unit created by a logical volume management program 113 by which a file system 112 recognizes storage resources. For example, a host file system 112 may mount a logical volume as "E: drive" in a Microsoft file system example.

Each logical volume may include one or more storage units 131 provided by a data storage device 44, as shown in previous figures. A logical volume management program 113 may concatenate multiple storage units 131 into a single virtual volume. Further, cache storage units may be defined for one or more storage units. The defined cache storage may be used for temporary storage space usually implemented by the higher performance storage or the higher performance network as opposed to original storage.

In this example embodiment, a logical volume of ID 00 has a range of logical block address 502 of 0x00000000 to 0x1fffffff. A file system 112 may specify this block address as a target for reading data. The logical volume 00 in this example embodiment consists of three storage units (e.g., storage units 131). The storage units may be specified by an original storage ID 503, original storage unit ID 504, and original storage LBA 505. The original storage ID 503 may be an identifier parameter used to identify storage assets or ports in which the storage unit 504 exists. Using example embodiments discussed previously, the port WWN of the network port 132H installed on the data storage 44, or the node WWN of the data storage 44, or the MAC address of the network port 132H installed on the data storage 44 may represent original storage ID 503. The original storage unit ID 504 may be an identifier parameter for storage unit 131. In an example implementation, the traditional logical unit number (LUN) may be used to represent storage unit ID 504. The original storage LBA 505 may be the address that specifies a range of block addresses that specifies a part of the storage unit 504. The cache storage ID 506 may identify the storage asset or port of the data storage unit (e.g., 131) used for caching. The cache storage unit ID may be an ID for storage units like the LUN. This cache storage information may be set for each original storage unit. The size of address range 505 and 508 may be equal in some embodiments. The term "null" may imply that no cache storage has been defined for this particular original storage unit. As shown in this example, a cache with a cache storage unit ID 01 and a cache storage ID 0x50060e80000000ab has been defined for logical volume ID 00, original storage Unit ID 0C that has a start/end cache storage LBA of 0xa0000000/0xaeffffff.

Figure 9:
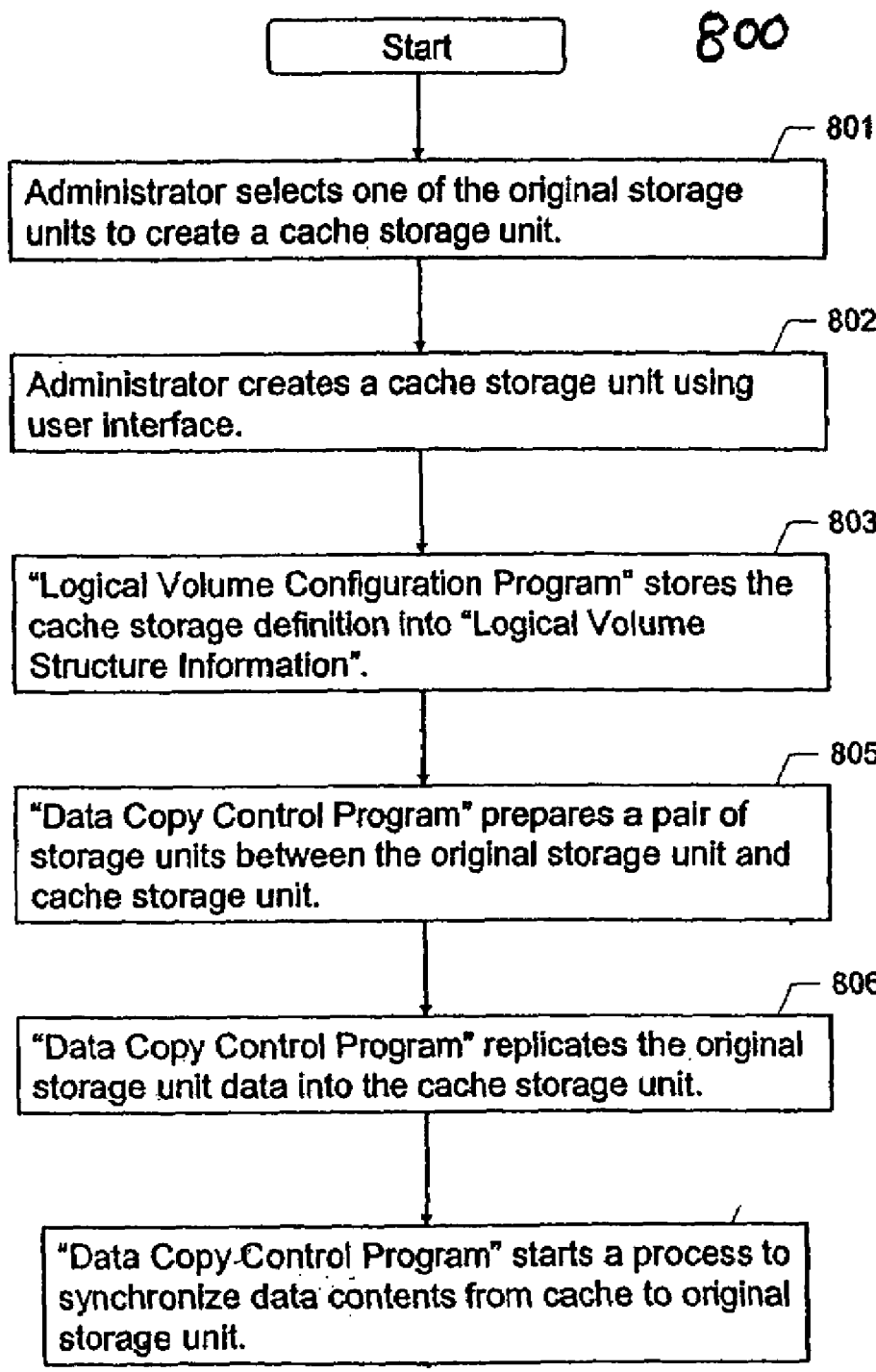
FIG. 9 is a flowchart of a process for configuring a cache storage environment according to an example embodiment of the present invention.

FIG. 9 shows a flowchart of a process for configuring a cache storage environment according to an example embodiment of the present invention. The process may be started, step 800, by a user using a user interface program 117. The user or administrator may select one of the original storage units to create a cache storage unit to be defined, step 801. The administrator may then create a cache storage unit using the user interface 611, step 802. A logical volume configuration program 116 may then store the cache storage definition into a logical volume structure information 114, step 803. A data copy control program 115 may then define an original storage unit and cache storage unit as a pair, step 805. This includes mapping the cache to the original storage unit. In some system environments, the storage units may have to be defined as "pair logical units" so that primary to secondary replication is automatically handled by data copy programs 121. A data copy control program 115 may then start a replication process by replicating the original storage unit data into the cache storage unit, step 806. This replication may continue to run persistently in the background while data is being transferred between the cache and the host device. After all data in the original storage unit is copied to the cache storage unit, at the logical volume manager component, a data copy control program 115 changes a copy direction to synchronize data contents from the cache storage unit to the original storage unit, step 807.

Figure 10:
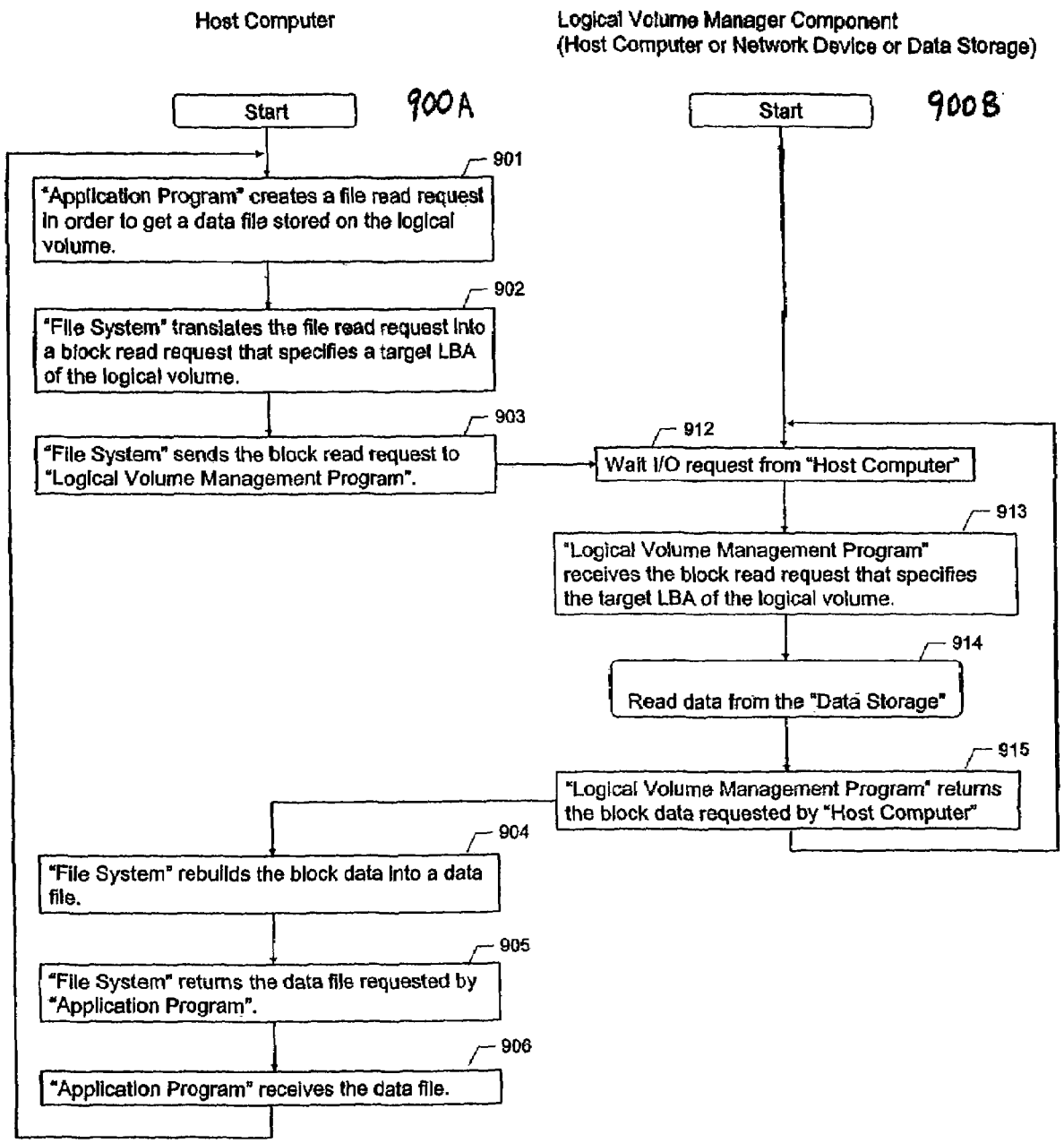
FIG. 10 is a flowchart of an example data read request process according to an example embodiment of the present invention.

FIG. 10 shows a flowchart of an example data read request process according to an example embodiment of the present invention. Processes may be started in a host computer, step 900A and a logical volume manager component, step 900B. On the host computer side, an application program 111 may create a file read request to get a data file stored on the logical volume, step 901. A file system 112 translates the file read request into a block read request that specifies a target logical block address of the logical volume, step 902. The file system 112 may then send the block read request to a logical volume management program 113, step 903.

The logical volume manager component may wait for an I/O request from the host computer, step 912, which has been generated when the file system sends the block read request, step 903. The logical volume management program 113 receives the block read request that specifies the target logical block address of the logical volume, step 913. A read data process then occurs at the logical volume management 113–117, step 914. The logical volume management process receives the data from the read data process and returns the block data requested by the host computer, step 915. At the host computer, the file system 112 receives the block data from the logical volume management 113–117 and rebuilds the block data into a data file, step 904. The file system returns the data file requested by the application program 111 to the application program 111, step 905. The application program 111 then receives the data file from the file system 112 completing the data read, step 906. The block address of the target file may be in the form of a SCSI block address, the read request may be in the form of a SCSI read request, and the logical value management 113–117 may return the block data to the file system 112 of the host computer via a SCSI messaging protocol.

Figure 11:
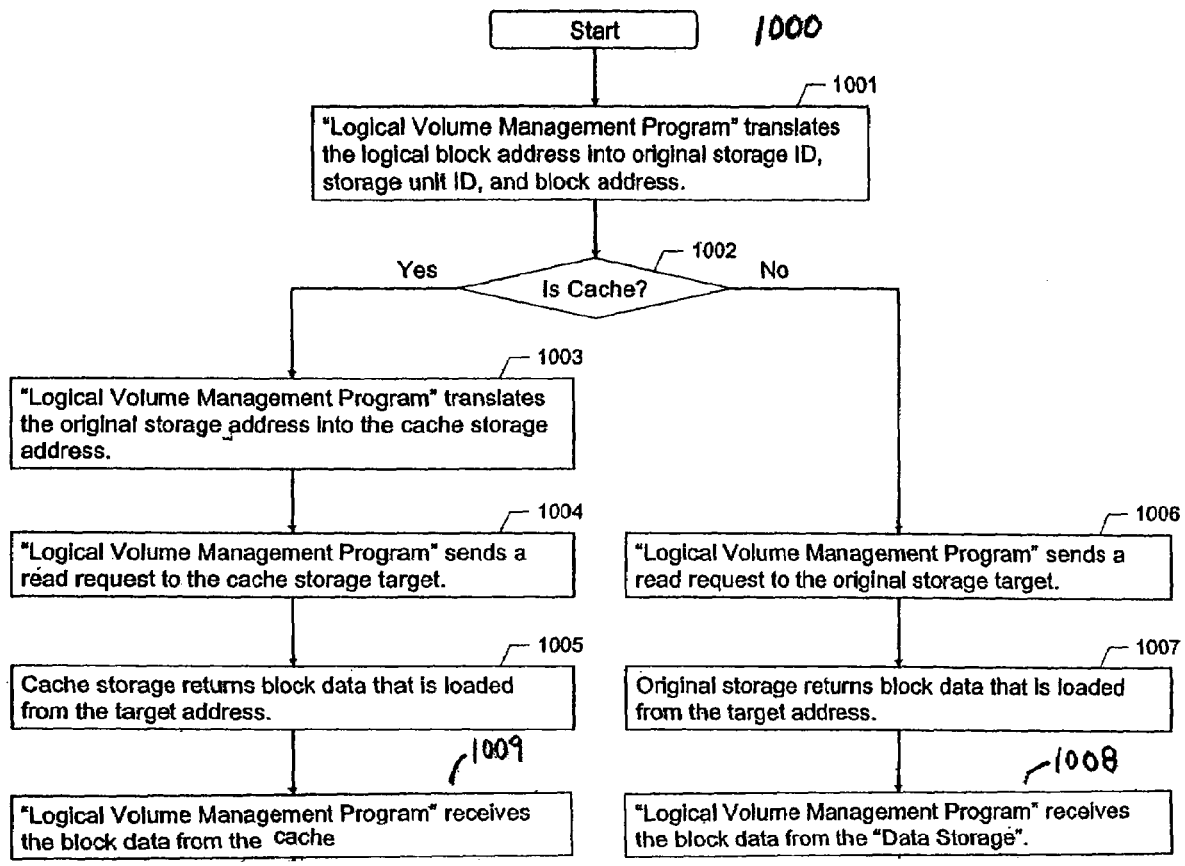
FIG. 11 is a flowchart for a logical volume data read process according to an example embodiment of the present invention.

FIG. 11 shows a flowchart for a logical volume data read process according to an example embodiment of the present invention. The logical volume manager process starts, step 1000, upon receipt of an I/O request from a host computer. The logical volume management program 113 translates the logical block address 502 into an original storage ID 503, storage unit ID 504, and block address 505, step 1001. For example, as shown in FIG. 8, a requested address of LBA 0x11001000 in logical volume 00 may be translated into LBA 0x00001000 of storage unit 0C in 0x50060E8000000E0A. A determination is then made if a cache storage is defined to the original storage target, step 1002.

If no cache has been defined for the original storage target, the logical volume management 113–117 may send a read request to the original storage target, step 1006. Then, the original storage target may return the requested block data that is loaded from the target address, step 1007. The logical volume management 113–117 receives the block data from the original storage target, step 1008.

If a cache has been defined for the original storage target, the logical volume management 113–117 may translate the original storage address into the cache storage address, step 1003. This may occur by using the address map defined in the logical volume structure information 114. The logical volume management 113–117 may then send a read request to the cache storage target, step 1004. The cache storage receives the read request and loads block data from the block address specified in the read request. The cache storage then returns the block data to the logical volume management 113–117, step 1005. The logical volume management 113–117 receives the block data from the cache storage, step 1009.

Figure 12:
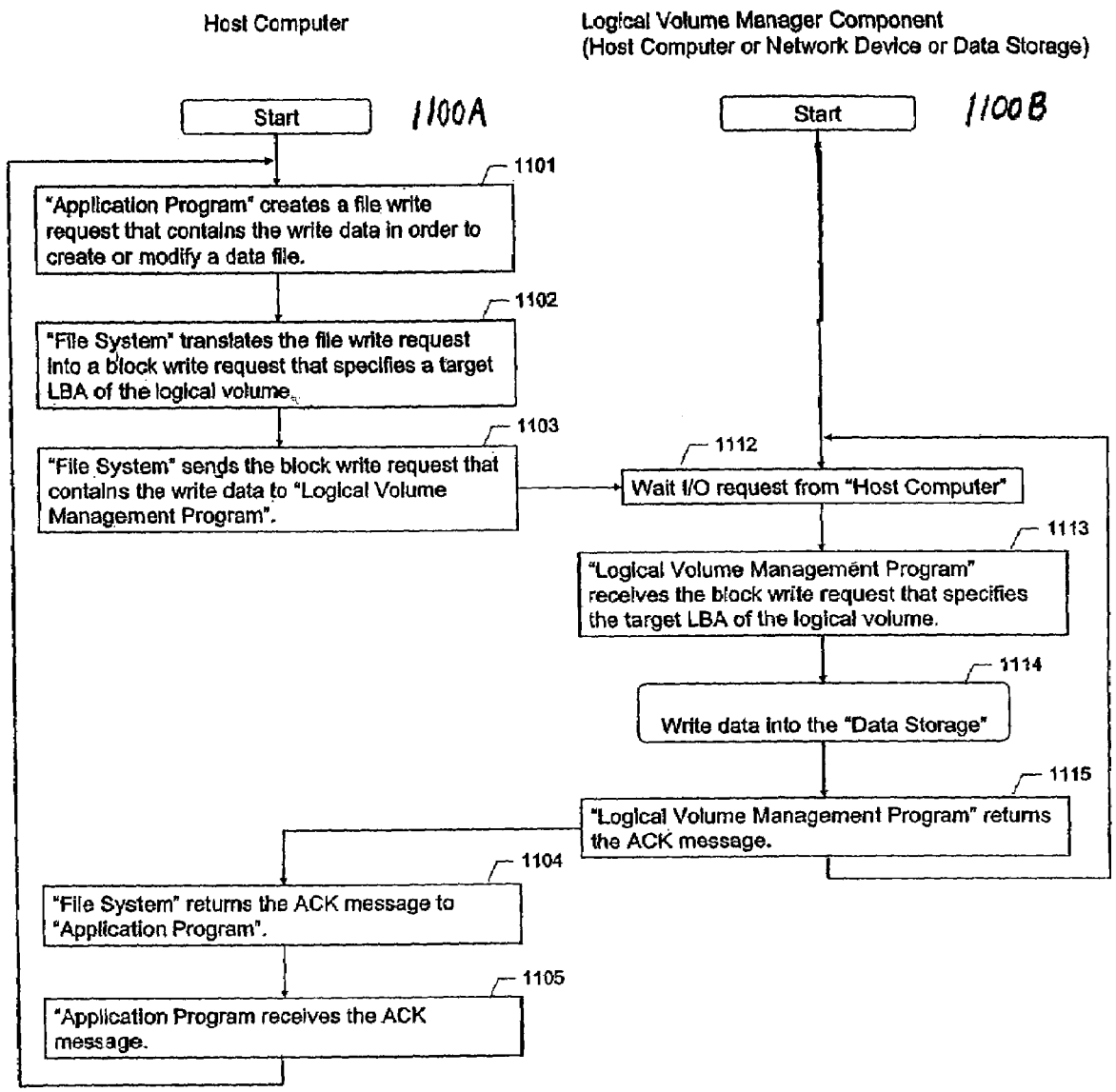
FIG. 12 is a flowchart of a data write request process, according to an example embodiment of the present invention.

FIG. 12 shows a flowchart of a data write request process, according to an example embodiment of the present invention. A process is started at a host computer, step 1100A, and a logical volume manager component, step 100B. At the host computer, an application 111 creates a file write request that contains the write data to create or modify a data file, step 1101. A file system 112 at the host computer may translate the file write request into a block write request that specifies a target logical block address of a logical volume, step 1102. The file system 112 may then send the block write request that contains the write data to a logical volume management program 113, step 1103.

The logical volume manager component may wait for an I/O request from the host computer, step 1112. The generation of the block write request from the file system 112 is an I/O request and the logical volume management program 113 receives the block write request that specifies the target logical block address of the logical volume, step 1113. A write data process may then be initiated at a logical volume management 113–117, step 1114. The logical volume management program 113 then returns an acknowledge message to the file system 112 at the host, step 1115. The acknowledgement message may be returned after the data has been saved into the storage unit. The file system 112 returns the acknowledge message to the application program 111, step 1104. The application program 111 receives the acknowledge message therefore completing the data write process, step 1105. The block address of the file may be in the form of an SCSI block address, the write request in the form of a SCSI write request, and the logical volume management program may return the acknowledge message by an SCSI messaging protocol.

Figure 13:
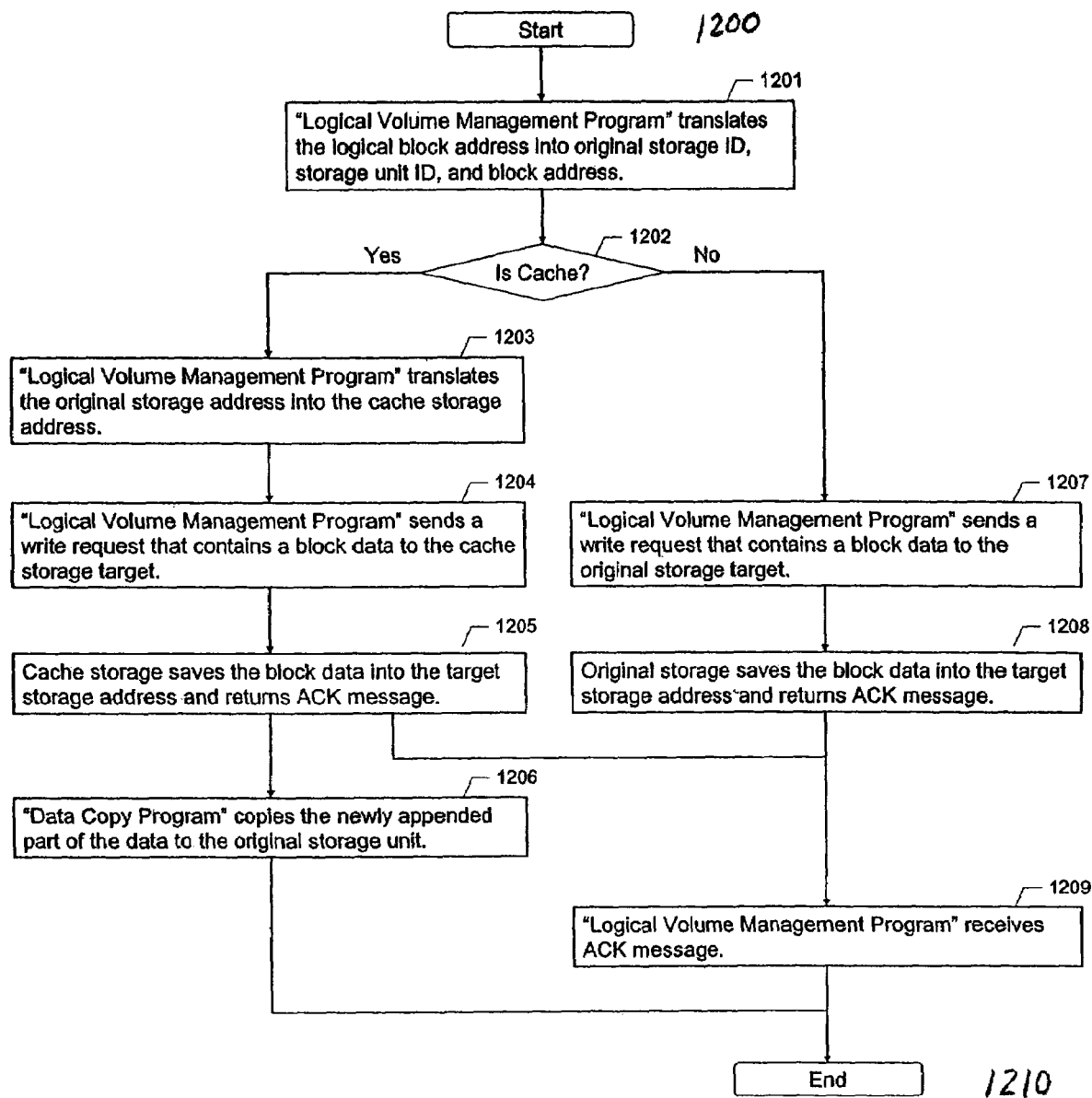
FIG. 13 is a flowchart of a logical volume data write process, according to an example embodiment of the present invention.

FIG. 13 shows a flowchart of a logical volume data write process, according to an example embodiment of the present invention. A logical volume data write process is started at the logical volume management 113–117, step 1200. A logical volume management program 113 translates the logical block address received from the file system 112 into an original storage ID 503, storage unit ID 504, and block address 505, step 1201. For example, using FIG. 8, a requested address of LBA 0x11001000 in logical volume 00 may be translated into LBA 0x00001000 of storage unit 0C in 0x50060E8000000E0A. It may then be determined if cache storage is defined for the original storage target, step 1202.

If no cache storage is defined for the original storage target, the logical volume management program 113 may send a write request that contains block data to the original storage target, step 1207. The original storage then saves the block data at the original storage target address and may return an acknowledge message, step 1208. The logical volume management program 113 receives the acknowledge message, step 1209 and returns the acknowledge message to the file system 112 as shown in FIG. 12, step 1115.

If cache storage has been defined for the original storage target, the logical volume management program 113 translates the original storage address into a cache storage address, step 1203. This may occur using the address mapping defined in the logical volume structure information 114. The logical volume management program 113 then sends a write request that contains block data to the cache storage target, step 1204. The cache storage saves the block data into the specified block address and may return an acknowledge message, step 1205. The logical volume management program 113 receives the acknowledge message and transmits it to the file system 112, step 1209. After the cache storage returns the acknowledge message, step 1205, a data copy program 121 copies the newly appended part of the data to the original storage unit, step 1206, to update the original storage. The process then ends 1210.

Therefore, according to embodiments of the present invention a high performance storage array in the form of a cache storage array may be connected to a host computer via a local high-speed network. When a host I/O request is sent to an original storage that may have poor performance, logical volume management according to embodiments of the present invention, forwards this request to the cache storage array. The cache storage array may load and save the data as requested and return a reply message immediately to the host without waiting for the I/O request to complete. The cache storage array may then copy data between the original storage and the cache storage array using a data copy program.

The embodiments of the present invention are advantageous in that access speed to remote devices is improved. Embodiments of the present invention therefore solve problems where a storage unit or network configuration does not give enough I/O performance, performance problems caused by network port bandwidth saturation, long-distance link, and poor (old) storage array use. Embodiments of the present invention may be applied to local storage devices, remote storage devices, high-speed storage devices and low-speed storage devices. This includes IP network based SAN implementations, among others.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for a caching storage system comprising:
   receiving an input/output (I/O) request from a host device that includes a logical block address;
   translating the logical block address into an original storage address for a storage target on a first storage device that includes an original storage ID, storage unit ID and block address;
   determining if a cache on a second storage device is defined for the storage target;
   translating the original storage address into an address for the cache on the second storage device associated with the storage target on the first storage device if the cache is defined on the second storage device for the storage target;

sending one of a read request and a write request to the cache address on the second storage device based on the I/O request; and performing one of receiving block-data from and transferring block data to the cache defined for the storage target identified by the original storage ID and storage unit ID, wherein before read operations and write operations, data in the storage target is replicated to the cache defined for the storage target, and wherein data written to the cache on the second storage device during write operations is copied to the storage target on the first storage device.

2. The method according to claim 1, further comprising creating the cache on the second storage device for the storage target if there is no cache defined for the storage target.

3. The method according to claim 1, further comprising sending a reply message from the cache to the host device after the sending of the one of the read request and the write request to the cache address based on the I/O request.

4. The method according to claim 1, further comprising creating a logical volume associated with the storage target before receiving the I/O request, comprising:

creating a new empty logical volume using a user interface;

adding the storage target into the created logical volume; and calculating an address map between the logical volume and the storage target, the address map mapping the logical block address to the original storage address.

5. The method according to claim 4, further comprising storing a logical volume configuration definition for the logical volume.

6. The method according to claim 1, further comprising creating the cache before receiving said I/O request, comprising:

selecting the storage target for which to create the cache;

creating the cache on the second storage device using a user interface, the creating including inputting cache storage information; and storing a cache definition for the cache.

7. The method according to claim 6, further comprising identifying a pair including the storage target and the cache.

8. The method according to claim 1, further comprising creating the cache on the second storage device for the storage target if there is no cache defined for the storage target by using a user interface of a user interface program.

9. The method according to claim 1, further comprising creating the I/O request by an application program at the host device, the I/O request being for one of a read from a logical volume and a write to a logical volume as the storage target on the first storage device.

10. The method according to claim 1, wherein the logical block address is a logical block address of a logical volume on the first storage device.

11. The method according to claim 1, further comprising:

sending one of a read request and a write request based on the I/O request to the storage target if no cache is defined for the storage target; and performing one of receiving block data from and transferring block data to the storage target identified by the original storage ID and storage unit ID.

12. A storage system comprising:

a host device;

a network device, the network device operatively connected to the host device via a first interface;

a first storage device and a second storage device, at least one of said first and second storage devices being operatively connected to the network device via a second interface and including a data copy capability; and a logical volume management means, the logical volume management means including:

means for receiving an input/output (I/O) request from the host device that includes a logical block address;

means for translating the logical block address into an original storage address for said first storage device that includes an original storage ID, storage unit ID and block address;

means for determining if a cache is defined on the second storage device for the first storage device;

means for translating the original storage address into an address for the cache on the second storage device associated with the first storage device if the cache is defined on the second storage device for the first storage device;

means for sending one of a read request and a write request to the cache address based on the I/O request; and means for performing one of receiving block data from and transferring block data to the cache on the second storage device defined for the first storage device identified by the original storage ID and storage unit ID, wherein before read operations and write operations, data in the first storage device is replicated to the cache defined for the first storage device, and wherein data written to the cache on the second storage device during write operations is copied to the first storage device.

13. The system according to claim 12, wherein the logical volume management means resides in the host device.

14. The system according to claim 12, wherein the logical volume management means resides in the network device.

15. The system according to claim 12, wherein the logical volume management means resides in said second storage device.

16. The system according to claim 12, wherein the logical volume management means resides in said second storage device in a NAS-based storage system.

17. The system according to claim 12, wherein the first interface comprises one of a Fibre Channel interface, an Ethernet interface, an Infiniband interface, and a SCSI interface.

18. The system according to claim 12, wherein the second interface comprises one of a Fibre Channel interface, an Ethernet interface, an Infiniband interface, and a SCSI interface.

19. The system according to claim 12, wherein the second interface comprises an Internet Protocol (IP) interface.

20. A storage system comprising:

a host device;

a network device, the network device operatively connected to the host device;

a first storage device and a second storage device, at least said second storage device being operatively connected to the network device and including a data copy capability; and a logical volume management means, the logical volume management means including:

means for receiving an input/output (I/O) request from the host device that includes a logical block address;

means for translating the logical block address into an original storage address for said first storage device that includes an original storage ID, storage unit ID and block address;

means for determining if a cache is defined on the second storage device for the first storage device;

means for translating the original storage address into an address for the cache on the second storage device associated with the first storage device if the cache is defined on the second storage device for the first storage device;

means for sending a write request to the cache address on the second storage device based on the I/O request; and means for transferring block data to the cache on the second storage device defined for the first storage device identified by the original storage ID and storage unit ID, wherein data written to the cache on the second storage device during write operations is copied to the first storage device.

21. The system according to claim 20, wherein the logical volume management means resides in said second storage device.

* * * * *